Nov. 9, 1954  G. H. MOREY  2,693,787
BIRD FEEDING STATION
Filed July 15, 1954
2 Sheets-Sheet 1
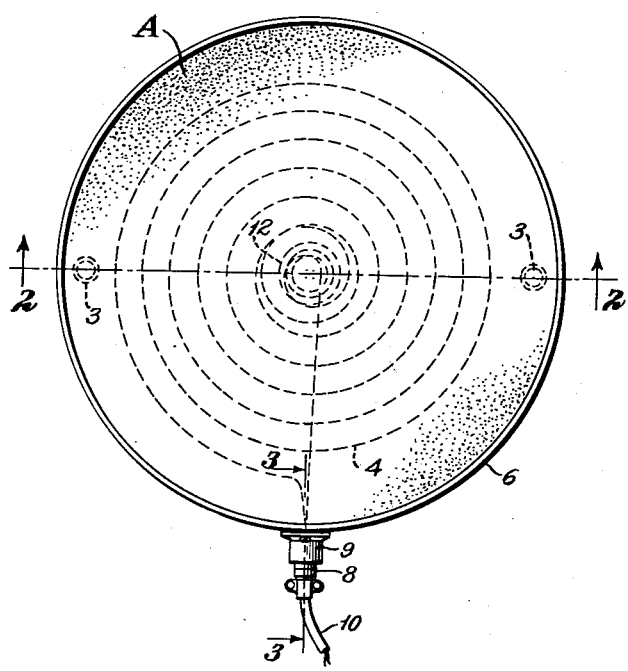
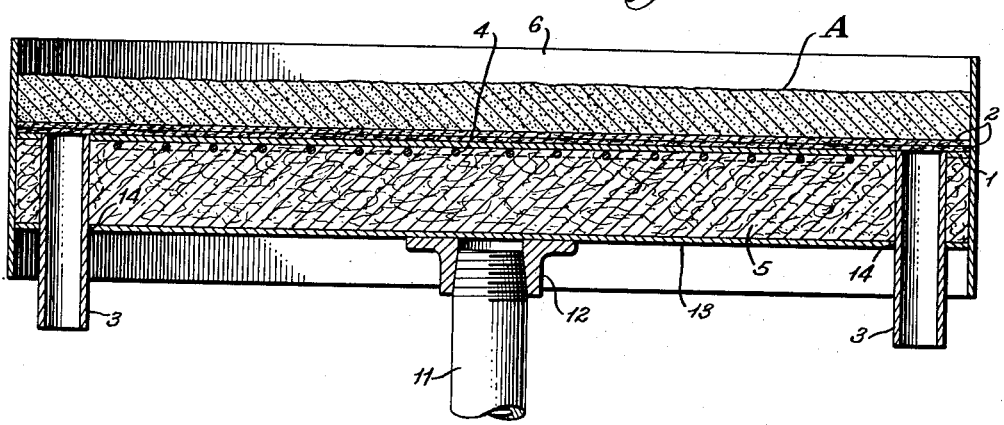
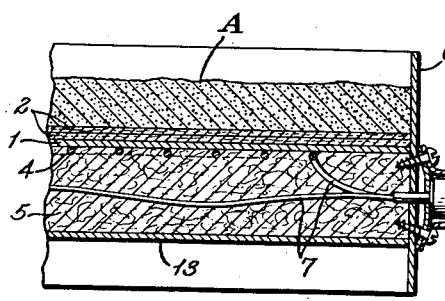
INVENTOR
Glen H. Morey
BY Burns, Doane & Benedict
ATTORNEYS Nov. 9, 1954

G. H. MOREY 2,693,787

BIRD FEEDING STATION

Filed July 15, 1954

INVENTOR
*Glen H. Morey*

BY
ATTORNEYS

United States Patent Office 2,693,787
Patented Nov. 9, 1954

2,693,787
BIRD FEEDING STATION
Glen H. Morey, Terre Haute, Ind.
Application July 15, 1954, Serial No. 443,509
7 Claims. (Cl. 119—51)

This invention relates generally to a wild bird feeding station. More specifically, the invention relates to an electrically heated bird feeder to permit wild birds to feed under all weather conditions and particularly during bad winter weather.

Presently available bird feeding devices are generally plagued with the problem of being covered by snow and ice during extended periods of the winter months. Obviously snow covering the feeder prevents the birds from obtaining the feed under the snow. Likewise, water freezing over the feed prevents the birds from reaching the feed on the feeder.

Many bird feeding structures allow the feed to be washed away by rain or melting snow and ice, and further, lack the grit necessary for a proper bird feeding diet. Furthermore, wild birds seek a place of warmth in cold weather and accordingly are not attracted to the general type of bird feeders now in use.

Accordingly, it is a primary object of this invention to provide a bird feeding station which will maintain the food placed on said feeding station available for consumption by the birds and in a substantially dry condition to reduce the possibility of its rotting.

It is a further object of this invention to provide a feeding station which will maintain a continually available supply of grit for supplementing the birds' food diet.

It is an additional object of this invention to provide a bird feeding station wherein the feed and grit will not be washed away by rain or melting snow and ice.

It is another object of this invention to provide a bird feeding station which will present a warm area to attract birds to the station in cold weather.

These and other objects of this invention will become more apparent from the description which follows of a specific embodiment as illustrated on the drawings.

In the drawings:

Figure 1 is a top plan view of one embodiment of the bird feeding station.

Figure 2 is an enlarged sectional view taken on line 2—2 of Figure 1.

Figure 3 is an enlarged detailed sectional view taken on line 3—3 of Figure 1.

Figure 4:
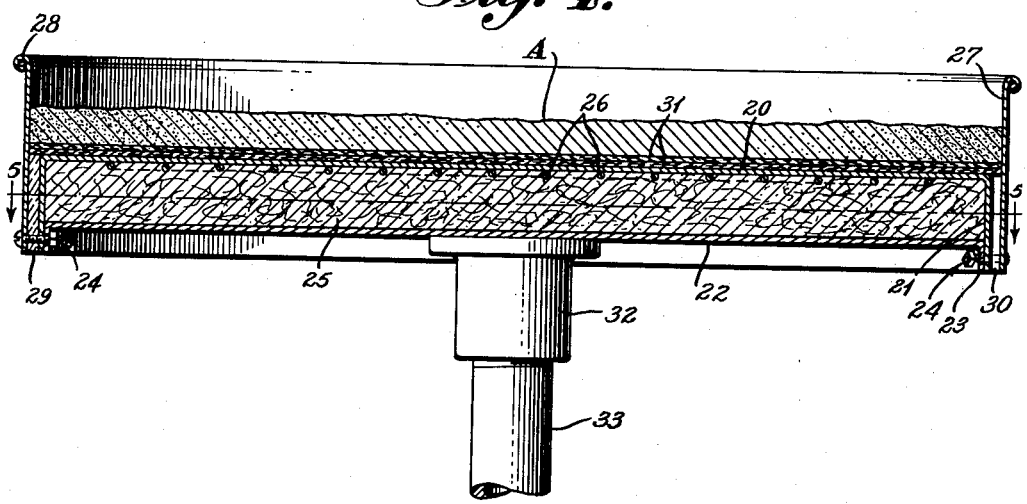
Figure 4 is a sectional view taken on line 4—4 of Figure 5, illustrating a modified bird feeding station construction.

In the embodiment illustrated by Figures 1 through 3 on the drawings, the bird feeding station includes a circular platform 1 on which it to be supported the feed and grit A necessary for the birds' diet. This platform 1 is preferably made of copper to insure even heat transfer from the heating means of the bird feeder described hereinafter. It will of course be understood, however, that any suitable material may be used for this platform.

Above the platform 1 several layers of a heat-resistant fabric 2 such as glass fabric, asbestos, et cetera, are positioned to receive the bird feed and grit A thereon. Extending downwardly and communicating with the upper surface of platform 1 are a pair of drain tubes 3 provided to conduct rain and melted snow or ice away from the bird feed and grit supported on the platform 1. It will be noted that the layers of heat-resistant fabric 2 cover the entire surface of the platform 1, including the opening of the drain tubes 3. Thus this fabric serves to prevent the feed and grit A from being washed down the drain tubes 3 as any water flows from the feed and grit. In addition, the layers of heat-resistant fabric 2 protect the birds' feet from coming in contact with the heat distributing platform 1, should the feed and grit A become so misdistributed as to bare a portion of the surface of the feeder platform.

Immediately beneath the platform 1 a flat coil 4 is provided to serve as a heating means for the bird feeding station and produce uniform heating of the platform 1. This coil may be suitably constructed of a single coiled length of resistance wire so that electric current flowing therethrough will produce heating in the coil.

It will be readily appreciated that a variety of types of heating means may be utilized in place of heating coil 4 within the scope of the invention. As one such suitable alternative, the platform 1 may be made of heat-resisting glass and an electrical conducting film applied to one side of the glass. Such electrical conducting films have been developed, which, when applied to the glass, permit an electric current passing through such film to generate heat. This substitute for the flat heating coil 4 would also produce the desired uniform heating of the platform 1 and thus heat the feed and grit carried by the feeding station.

Surrounding the heating coil 4 with the major portion positioned beneath the coil is a body of insulating material 5 as glass wool. This material serves to prevent heat loss away from the bottom of the platform 1 and thereby insure that the heat from coil 4 distributed by platform 1 is utilized in melting snow and ice on the feeder and drying the feed and grit supported on the platform.

A cylinder rim 6 extends around the periphery of the platform 1 and is suitably secured thereto as by soldering or welding. The rim 6 extends above the surface of the platform 1 to provide a flange for the platform in retaining the feed and grit thereon. Further, this rim extends downwardly below the plane of platform 1 to encase the heating coil 4 and insulating material 5 to thereby insure that moisture does not come in contact with the coil and insulating material. In a structure wherein the platform and heating means are constructed of heat-resisting glass and an electrical conducting film applied thereto, the platform 1 may be made with the rim 6 and drain tubes 3 formed of glass as a single integral unit with the platform.

A pair of lead-in connections 7 extend from the ends of the flat heating coil 4 to a connector 8 mounted in a casing 9 suitably secured to the outer wall of the rim 6. The connector 8 connects the lead-in connections 7 to a source of electricity through a conventional electric cord 10. The connector 8 may be of any suitable construction to enable the cord 10 to be readily disconnected from the bird feeding device. Thus it may be possible in times of good weather when the heating coil 4 is not needed to disconnect the coil and use the device without energizing the electric heating means.

To support the feeder at the desired level above the ground, a post 11 of the required length is provided with the lower end suitably secured to a supporting structure or embedded in the ground, and the other end secured to a flanged coupling 12. As specifically shown in Figure 2, the post 11 is a pipe with the upper end threaded to engage the internally threaded coupling 12.

A plate 13 is secured to the flanged coupling 12 as by soldering or welding. This plate is circular, having a diameter so as to be received within the cylindrical rim 6 and is provided with openings 14 through which the drain tubes 3 extend. Thus in using the support means comprised of pipe 11, coupling 12 and plate 13, the bird feeding station is lowered on to the plate 13 with the drain tubes 3 freely sliding in the openings 14. Thus it will be seen that the insulating material 5 is sandwiched between the platform 1 and plate 13 and that the entire bird feeding station is prevented from being laterally displaced by the rim 6 surrounding plate 13 and the drain tubes 3 extending through the openings 14.

Figure 5:
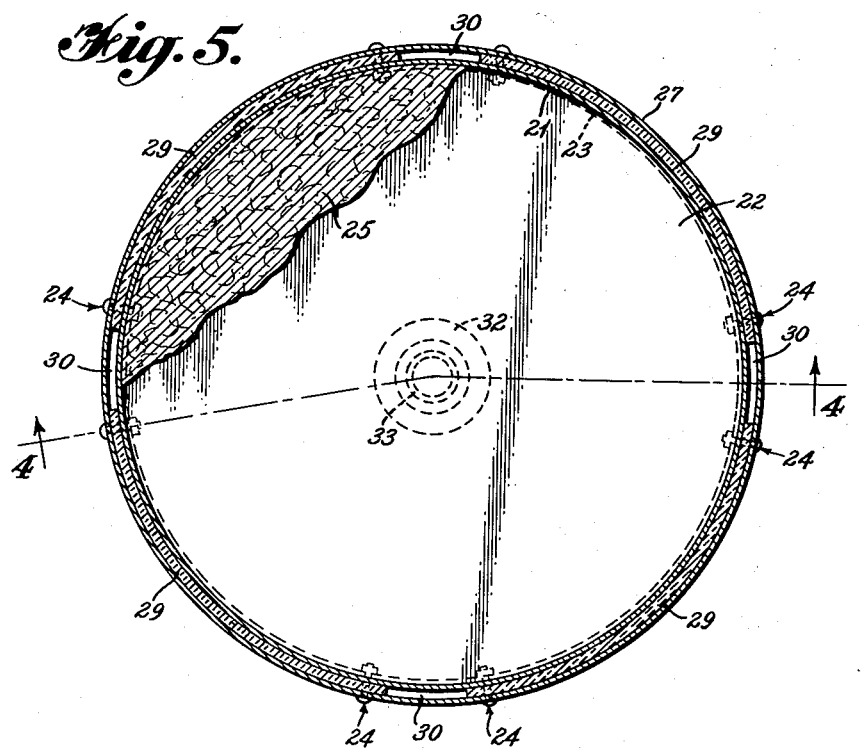
Figure 5 is a horizontal sectional view taken on line 5—5 of Figure 4 with parts broken away.

Figures 4 and 5 illustrate a modified embodiment of the bird feeding station possessing the general characteristics of the hereinabove described embodiment. In the structure of Figures 4 and 5 there is provided a platform 20 having a downwardly turned flange 21 extending around the periphery thereof. A plate 22 having a peripheral flange 23 is secured, as by suitable fasteners 24, to the lower edge of flange 21 so that the plate is spaced from the underside of platform 20. The space between platform 20 and plate 22 provides a cavity having a mass of insulating material 25, such as glass wool, positioned therein.

In this embodiment, as illustrated, a flat coil 26 is embedded in the insulating material 25 to serve as a heating means for the bird feeding station to uniformly heat platform 21 in the manner as described for the embodiment of Figures 1 through 3. It will be readily recognized that a variety of types of heating means may be utilized in place of the specific heating coil 26 as illustrated, such as for example the alternative described in connection with the firstly illustrated embodiment. The ends of the heating wire which forms coil 26 are provided with lead-in connections (not shown) and thereby suitably connected to a source of electrical power such as in the manner illustrated in Figure 3 for the firstly described embodiment.

A rim 27 having an upper rolled edge 28 is secured to the flanges 21 and 23 by fasteners 24. This rim is spaced radially outwardly of the outer surface of flange 21 with arcuate insulating strips 29 secured intermediate flange 21 and the inner surface of the rim 27. The adjoining ends of insulating strips 29 are spaced from one another to provide a plurality of drainage ports 30 at spaced positions around the periphery of the platform 20.

The insulating strips 29 which may be formed of any suitable type of insulation, as for example asbestos, serve a dual purpose in the construction of the bird feeding station of Figures 4 and 5. First these strips function to support the rim 27 spaced outwardly from the edge of platform 20 and by reason of their ends being spaced one from another, provide the drainage ports 30 which facilitate draining of any moisture which may collect on top of platform 20 in the feed and grit supported thereon. Secondly the use of insulation in the form of strips 29 between the rim 27 and the edge of platform 20 materially reduces the transfer of heat outwardly from the platform to rim 27 when the platform 20 is heated by energization of coil 26. Heating of the rim 27 results in loss of heat to the surrounding atmosphere and therefore by precluding heat transfer to the rim, the power requirements for the bird feeding station may be reduced and more effectively applied to the basic intended purpose of heating the feed and grit so as to prevent freezing thereof or to remove accumulations of snow and to effect rapid drying of the feed and grit.

Layers of heat resistant fabric 31, such as glass fabric, asbestos, etc., are disposed over the platform 20 to extend outwardly to the inner surface of rim 27. As in the previously described embodiment, this foraminous layer carries the feed and grit A thereon. Likewise such layers of fabric serve to prevent the feed and grit from being washed down the drain ports 30 and protect the birds' feet from coming in direct contact with the heat distributing platform 20 in the event of misdistribution of the feed and grit such as to bare a portion of the surface of the feeder platform.

To support the bird feeding station at the desired level above the ground a flanged coupling 32 is secured to the underside of plate 22 and a post 33 of suitable length engaged with coupling 32 and secured to a supporting structure or embedded in the ground at its lower end for mounting the bird feeding station.

In the two specific embodiments illustrated on the drawings post supporting means have been illustrated. It will be recognized that such specific support means may be dispensed with if desired and the bird feeder simply supported on a window sill or other support means as may be available.

The bird feeding stations illustrated are shown to be circular in shape. However, it will be appreciated that within the scope of the instant invention the feeding station may be of any desired shape, such as square or rectangular.

The instant application is a continuation-in-part of my copending application Serial No. 353,084, filed May 5, 1953, entitled "Bird Feeding Station."

Having thus described my invention, what I claim is:

1. A bird feeding station comprising a platform to support a supply of feed and grit thereon, a rim extending around the edge of said platform, drainage port means for draining water from said platform, heating means positioned adjacent the underside of said platform, and a foraminous heat resisting sheet member covering said drain means and said platform to prevent the feed and grit from being washed down said drain and protect the birds from excess heat from said heating means.

2. A bird feeding station as recited in claim 1 having a post to support said platform at the desired height above the ground.

3. A bird feeding station as recited in claim 1 wherein said drainage port means is formed by said rim being spaced outwardly from the edge of said platform to provide an opening intermediate said rim and the edge of said platform.

4. A bird feeding station comprising a feed and grit supporting platform, a drain tube connected to said platform and extending therethrough, at least one layer of heat resistant foraminous material positioned on said platform to prevent the feed and grit from being washed down said drain tube, an electric heating coil surrounded by insulation positioned adjacent the underside of said platform, a rim around the periphery of said platform extending above and below the plane of the platform to retain the grain and grit on said platform and encase the heating coil and insulation beneath said platform, and electrical connections for connecting said coil to a source of electricity.

5. A bird feeding station as recited in claim 4, provided with a support means comprising a post and a plate secured to the upper end thereof, said plate having an aperture located so as to permit said drain tube to extend therethrough and said rim enclosing the periphery of said plate whereby said insulation and heating coil are entirely enclosed between said platform, plate and rim.

6. A bird feeding station as recited in claim 4 wherein said electrical connections comprise a disconnectable coupling to enable said heating coil to be readily disconnected from the source of electricity.

7. A bird feeding station comprising a platform to support a supply of feed and grit thereon, a rim extending around and spaced outwardly from the edge of said platform, insulating strips interposed between said rim and the edge of said platform to reduce heat transfer between said rim and said platform, the adjoining ends of said strips being spaced from one another to provide drainage ports at spaced points around the edge of said platform, heating means positioned adjacent the underside of said platform and a foraminous heat resisting sheet member covering said ports and said platform to prevent the feed and grit from being washed through said ports and protect the birds' feet from excess heat from said heating means.

References Cited in the file of this patent

UNITED STATES PATENTS

| Number | Name | Date |
|---|---|---|
| 1,642,304 | Lantz | Sept. 13, 1927 |
| 1,912,300 | Parks | May 30, 1933 |
| 2,019,407 | Graves, Jr. | Oct. 29, 1935 |
| 2,479,355 | Hemker | Aug. 16, 1949 |
| 2,497,998 | Lee | Feb. 21, 1950 |
| 2,606,522 | Harris | Aug. 12, 1952 |

FOREIGN PATENTS

| Number | Country | Date |
|---|---|---|
| 580,102 | Germany | July 6, 1933 |